United States Patent
Nelson et al.

(10) Patent No.: US 11,676,088 B2
(45) Date of Patent: Jun. 13, 2023

(54) SYSTEMS AND METHODS FOR DISTRIBUTED RISK ANALYSIS

(71) Applicant: Walmart Apollo, LLC, Bentonville, AR (US)

(72) Inventors: Christina Nelson, Alexandria, VA (US); Kshithi Venkatesh, Bentonville, AR (US); Clinton Preston, Cave Springs, AR (US); Shekar Dadi, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/670,839

(22) Filed: Feb. 14, 2022

(65) Prior Publication Data

US 2022/0253764 A1    Aug. 11, 2022

Related U.S. Application Data

(63) Continuation of application No. 16/670,704, filed on Oct. 31, 2019, now abandoned.

(60) Provisional application No. 62/753,636, filed on Oct. 31, 2018.

(51) Int. Cl.
    *G06Q 10/0635*    (2023.01)
    *G06N 20/00*      (2019.01)
    *G06F 16/28*      (2019.01)

(52) U.S. Cl.
    CPC ....... *G06Q 10/0635* (2013.01); *G06F 16/285* (2019.01); *G06N 20/00* (2019.01)

(58) Field of Classification Search
    CPC .......... G06Q 10/00–50/00; G06N 3/00–10/00; G06F 1/00–21/00

USPC ................................................ 705/7.11–7.42
See application file for complete search history.

(56) References Cited

U.S. PATENT DOCUMENTS

| | | |
|---|---|---|
| 7,711,637 B2 | 5/2010 | Lawrence |
| 7,818,659 B2 | 10/2010 | Kahn |
| 8,244,629 B2 | 8/2012 | Lewis |
| 8,375,073 B1 | 2/2013 | Jain |
| 8,676,837 B2 | 3/2014 | Bharat |
| 8,880,499 B1 | 11/2014 | Wu |
| 9,208,460 B2 | 12/2015 | Rosenburg |
| 9,495,652 B1 | 11/2016 | Cook |
| 9,760,629 B1 | 9/2017 | Bharat |
| 9,881,077 B1 | 1/2018 | Alfonseca |
| 10,057,206 B2 | 8/2018 | Naidu |
| 10,061,760 B2 | 8/2018 | Brant |
| 10,169,705 B2 | 1/2019 | Deluca |
| 10,489,802 B1 * | 11/2019 | Zhdanov ............ G06Q 30/0202 |
| 10,613,905 B2 * | 4/2020 | Nutter ................... G06F 9/5061 |
| 2003/0018513 A1 | 1/2003 | Hoffman |
| 2003/0110186 A1 | 6/2003 | Markowski |
| 2005/0021360 A1 | 1/2005 | Miller |
| 2005/0086227 A1 | 4/2005 | Sullivan |
| 2006/0265489 A1 | 11/2006 | Moore |

(Continued)

OTHER PUBLICATIONS

USPTO; U.S. Appl. No. 16/670,704; Non-Final Office Action dated Jun. 17, 2021; (23 pages).

(Continued)

*Primary Examiner* — Alan S Miller
(74) *Attorney, Agent, or Firm* — Fitch, Even, Tabin & Flannery LLP

(57) ABSTRACT

Systems and methods for distributed risk analysis are discussed.

19 Claims, 8 Drawing Sheets

(56) References Cited

U.S. PATENT DOCUMENTS

| | | |
|---|---|---|
| 2008/0140514 A1 | 6/2008 | Stenger |
| 2008/0281832 A1 | 11/2008 | Pulver |
| 2008/0319922 A1 | 12/2008 | Lawrence |
| 2011/0173216 A1 | 7/2011 | Newman |
| 2012/0102420 A1 | 4/2012 | Fukahori |
| 2012/0158753 A1 | 6/2012 | He |
| 2012/0179692 A1 | 7/2012 | Hsiao |
| 2012/0239619 A9 | 9/2012 | Hersh |
| 2012/0278428 A1 | 11/2012 | Harrison |
| 2012/0303703 A1 | 11/2012 | Richter |
| 2013/0021370 A1 | 1/2013 | Dunn |
| 2013/0024788 A1 | 1/2013 | Olsen |
| 2013/0061156 A1 | 3/2013 | Olsen |
| 2013/0110978 A1 | 5/2013 | Gordon |
| 2013/0162529 A1 | 6/2013 | Turk |
| 2013/0211872 A1 | 8/2013 | Cherry |
| 2013/0304822 A1 | 11/2013 | Tetreault |
| 2013/0332523 A1 | 12/2013 | Luu |
| 2014/0019295 A1 | 1/2014 | Brownley |
| 2014/0019471 A1 | 1/2014 | Linton |
| 2014/0052644 A1 | 2/2014 | Ott |
| 2014/0114962 A1 | 4/2014 | Rosenburg |
| 2014/0122163 A1 | 5/2014 | Simpson |
| 2014/0207860 A1 | 7/2014 | Wang |
| 2014/0279394 A1 | 9/2014 | Stibel |
| 2014/0351061 A1 | 11/2014 | Luu |
| 2015/0148061 A1 | 5/2015 | Koukoumidis |
| 2015/0163626 A1 | 6/2015 | Zimmer |
| 2015/0242776 A1 | 8/2015 | Wilcox |
| 2016/0379326 A1 | 12/2016 | Chan-Gove |
| 2017/0061003 A1 | 3/2017 | Baird |
| 2017/0140312 A1 | 5/2017 | Pai |
| 2017/0302610 A1 | 10/2017 | Naidu |
| 2018/0060293 A1 | 3/2018 | Agrawal |
| 2018/0349934 A1 | 12/2018 | Hughes |
| 2019/0096214 A1 | 3/2019 | Pourmohammad |
| 2019/0327259 A1 | 10/2019 | Defelice |
| 2020/0065727 A1 | 2/2020 | Connell |
| 2020/0097869 A1 | 3/2020 | Bajaj |
| 2020/0134523 A1 | 4/2020 | Nelson |

OTHER PUBLICATIONS

USPTO; U.S. Appl. No. 16/670,704; Notice of Allowance and Fees Due (PTOL-85) dated Nov. 15, 2021; (pp. 1-7).

* cited by examiner

SYSTEMS AND METHODS FOR DISTRIBUTED RISK ANALYSIS

RELATED APPLICATIONS

This application is a continuation of U.S. application Ser. No. 16/670,704, filed Oct. 31, 2019, which is related to and claims the benefit of priority to U.S. Provisional Patent Application No. 62/753,636, filed Oct. 31, 2018, the entire contents of which are expressly incorporated herein in their entirety by reference.

BACKGROUND

Businesses typically assess and/or mitigate risk to assets, such as people or facilities, caused by a variety of factors, such as security threats or transportation issues.

BRIEF DESCRIPTION OF THE DRAWINGS

The accompanying drawings, which are incorporated in and constitute a part of this specification, illustrate one or more embodiments and, together with the description, help to explain the embodiments. The embodiments are illustrated by way of example and should not be construed to limit the present disclosure. In the drawings.

Figure 1:
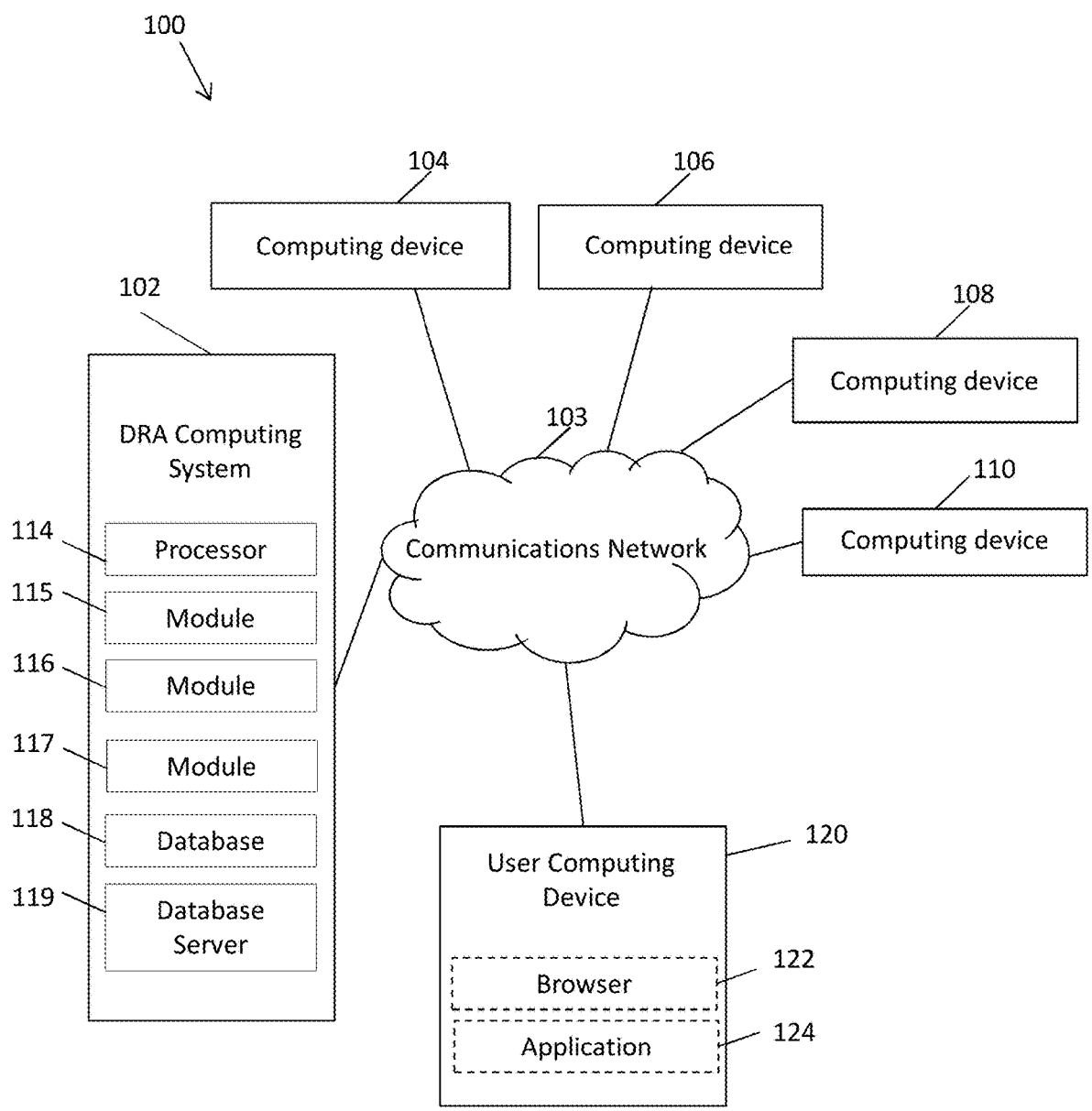
FIG. 1 is an exemplary networked environment for distributed risk analysis, in accordance with embodiments of the present disclosure.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Systems and methods are described herein for distributed risk analysis. The system includes a database configured to store data files and a risk analysis module executable by at least one processor. In an exemplary embodiment, the data files are associated with news articles and risk scores from third parties, such as global risk subscription services. The risk analysis module is communicatively coupled to sources (e.g., the third parties) associated with various geographical locations. The risk analysis module, when executed, aggregates data files from the sources, classifies the data files based on subject matter, and stores the data files into the database. The system further includes a user dashboard executing on a computing device and communicatively coupled to the risk analysis module. The user dashboard is configured to display at least one article associated with a subject matter based on a data file, receive a user selection of the at least one article to initiate an event, receive user comments associated with the event, and display the user comments in association with the event. In some embodiments, the system further includes a database server coupled to the database and configured to retrieve information from the database for display on the user dashboard.

An event enables a user to provide commentary and analysis regarding the at least one article. The user can use the user dashboard to create, save, view, edit, and share events. In some embodiments, users that did not create the event can still provide commentary and/or analysis within the event.

In some embodiments, the risk analysis module, when executed, is further configured to group articles based on related subject matter. In such an embodiment, the user dashboard displays the grouped articles in a single-story feed. For example, the articles may be grouped and displayed based on a particular region or country. In further embodiments, the risk analysis module displays articles to a user based on the user's assigned or identified location or address or business area (for example, if a user is identified as being a resident of California, the user may receive articles associated with the western United States as news associated with the western United States may be more relevant to the user than news associated with the east coast). In additional embodiments, the displayed articles are based on geo-fencing, in which the displayed articles are based on the user's location determined, for example, using a global positioning system (GPS) associated with the user (for example, via a smart phone associated with the user). For example, if, via geofencing, the risk analysis module determines the user to be in China, the user may be displayed articles associated with China.

In some embodiments, the user dashboard generates and displays a risk-related heat map that indicates risk trends. The risk-related heat map may display risk over a given time to allow for trend determination. For example, in one embodiment, the risk-heated map may display risk over a specific time period, for example the past 24 hours. In another embodiment, a user may select an interval to view the risk-heated map at discrete times over a time period (for example, every hour over a 24 hour period).

In some embodiments, the user dashboard displays an article-related map that displays markers or pins at locations associated with articles and/or created events. For example, if a user creates an event associated with Austin, Tex., a marker for the event appears on Austin, Tex. on the article-related map. A user can then select the marker to be directed to a page on the user dashboard displaying the event.

In some embodiments, the user can use the user dashboard to tag other users in an event. In further embodiments, the user dashboard can include an executive mode, where the articles and/or events are filtered to display particular information, for example, sensitive information, to authorized users and not to unauthorized users. In still further embodiments, the risk analysis module may monitor social media for articles to display on the user dashboard.

In some embodiments, the system further includes a notification module that generates notifications (e.g., emails, text messages, etc.) to users based on predefined criteria. The predefined criteria may include new articles or risk scores received by the risk analysis module. The predefined criteria can be further defined to new articles or risk scores associated with a particular country, a particular region, a particular subject matter, etc. In further embodiments, the notification module uses a user's assigned or identified location or business area, in which the notification process is based on the user location or a business area assigned to the user (for example, news in the western United States may not be as relevant to a user on the east coast). In additional embodiments, the notification module uses geofencing, in which the notification process is based on the user's location determined, for example, using a global positioning system (GPS) associated with the user (for example, via a smart phone associated with the user). For example, if, via geofencing, the notification module determines the user to be in China, the user may receive notifications regarding articles or risk scores associated with China.

In some embodiments, the system further includes a machine learning module to use machine learning to suggest articles for a given user based on the user's history of reading articles or creating events.

The described systems and methods enable the aggregation of articles from throughout the world. The articles are associated with potential risks to users, facilities, and/or businesses. The described systems and methods enables the presentation of the articles to users using a user dashboard, where the users can view the articles on a user dashboard and provide analysis based on the articles that other users can view and provide comment.

FIG. 1 is an exemplary networked environment 100 for distributed risk analysis, in accordance with embodiments of the present disclosure. The environment 100 includes a distributed risk analysis (DRA) computing system 102 communicatively coupled, via communications network 103, to at least computing device 104, computing device 106, computing device 108, and computing device 110. The computing devices 104, 106, 108, and 110 transmit to the DRA computing system 102 news articles, risk scores, and/or risk analysis for different geographical locations (e.g., different states, regions, countries, etc.). The DRA computing system 102 may use pull coding or client pull where the initial request for the data files originates from the DRA computing system 102, and then is responded to by a server among the computing devices 104, 106, 108, and/or 110. Alternatively, a server among computing devices 104, 106, 108, and/or 110 may push the data files to the DRA computing system 102. The DRA computing system 102 includes at least one processor 114 executing at least one risk analysis module 115. In some embodiments, the DRA computing system 102 may further include a notification module 116, a machine learning module 117, database(s) 118, and/or a database server 119.

In an exemplary embodiment, the DRA computing system 102 is communicatively coupled to at least one user computing device 120. The user computing device 120 may be, for example, a desktop computer or a mobile computing device (i.e., a smartphone). The user computing device 120 includes a web browser 122 and/or an application 124 (i.e., a desktop application and/or a mobile application) to enable a user to view and interact with a user dashboard displayed on the web browser 122 and/or the application 124.

Database 118 can include one or more databases. A database is a structured set of data held in a computer device, such as a server. In some embodiments, database 118 is held within the DRA computing device 102 that may include the database server 119. In other embodiments, one or more databases 118 can be present on one or more database systems physically separate from one another and/or separate from the DRA computing device 102. Database software provides functionalities that allow building, modifying, accessing, and updating both databases and the underlying data. Databases and database software reside on the database server 119. The database server 119 is a collection of hardware and software that provide storage and access to the database 118 and enable execution of the database software.

The communications network 103 can be any network over which information can be transmitted between devices communicatively coupled to the network. For example, one or more portions of communications network 103 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Figure 2:
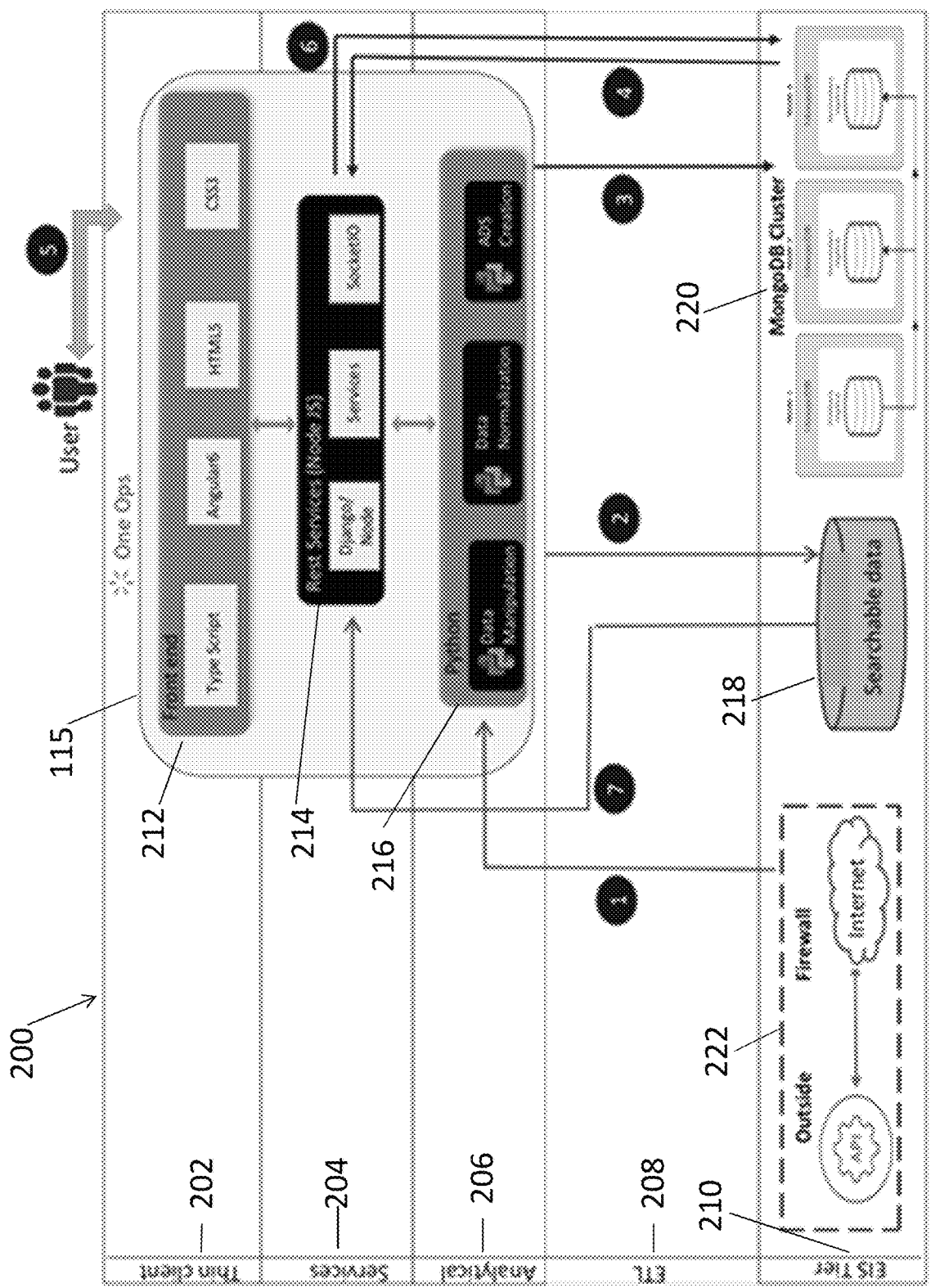
FIG. 2 is an exemplary architecture of a distributed risk analysis system for distributed risk analysis, in accordance with an exemplary embodiment.

FIG. 2 is an exemplary architecture 200 of a distributed risk analysis system for distributed risk analysis, in accordance with an exemplary embodiment. The architecture 200 includes the risk analysis module 115. The risk analysis module 115 includes a front end 212, a NodeJS REST based API 214, and a python-based module 216, as explained below. The risk analysis module 115 is communicatively coupled to a backend database 218 (e.g., an Apache Solr or ElasticSeach database) and/or a MongoDB Cluster 220. The backend database 218 holds searchable data. The MongoDB Cluster 220 holds user input (e.g., comments and events), and articles obtained from third party vendors or created in-house (also referred to as ADS data). For illustration purposes, the architecture 200 is broken down into five tiers: a thin client tier 202, a services tier 204, an analytics tier 206, an extract, transform, and load (ETL) tier 208, and an enterprise information system (EIS) tier 210 which are discussed further below. It should be appreciated that the architecture may be arranged in different tiers than those specifically shown without departing from the scope of the present invention.

In an exemplary embodiment, the thin client tier 202 includes the front end 212 used to communicate with users via a user dashboard, as described herein. The front end 212 may use, for example, Angular6 (built with typescript) with HTML5 and CSS3. The front end 212 pushes results, such as articles and events, to users as well as accepts input (e.g., requests) from the users.

In an exemplary embodiment, the services tier 204 includes the NodeJS REST based API 214. The NodeJS REST based API 214 may use Django/NodeJS and SocketIO. The NodeJS REST based API 214 is used for exchanging data between applications or systems. For example, the NodeJS REST based API 214 performs searches on the backend database 218 and/or requests data from the MongoDB cluster 220. The NodeJS REST based API 214 may also store user inputs, such as comments and events, into the MongoDB cluster 220. Based on user input requests, the NodeJS REST based API 214 fetches search results from the backend database 218. The results are displayed to the user in the user dashboard via the front end 212. The front end 212 communicates with the NodeJS REST based API 214.

In an exemplary embodiment, the analytics tier 206 fetches, via an API, data files (e.g., news articles and risk scores) from third parties. In an exemplary embodiment, the data files are associated with news articles and risk scores from third parties, such as global risk subscription services. The analytics tier 206 performs data manipulation, data normalization, and ADS data creation to prepare the fetched data to be stored in the backend database 218 and/or the MongoDB cluster 220. At least part of the normalized data is stored in the backend database 218 for search purposes. The ADS data is stored into the MongoDB cluster 220. In an exemplary embodiment, the analytics tier 206 includes the python-based module 216 for performing the data manipulation, data normalization, and ADS creation. For example, the data fetched through APIs is manipulated by the python-based module 216 to bring all articles to a standard JSON structure containing same keys. In another example, during data manipulation, the python-based module 216 classifies the data files based on the subject matter. The python-based module 216 communicates with the NodeJS REST based API 214.

The data manipulation and data normalization is used since article categories are performed differently in different sources and need to be normalized to internal standard categories. Likewise, risk scores for geographical locations are obtained on different scales from different sources, which are again normalized to a standard scale before using them to display in a risk map.

In an exemplary embodiment, the extract, transform, and load (ETL) tier 208 retrieves data from third party source systems and stores the data into data storage.

In an exemplary embodiment, the EIS tier 210 includes the data retrieved from the third party source systems and placed into data storage. The EIS tier 210 includes the backend database 218, the MongoBD cluster 220, and an API 222 for accessing the Internet and retrieving the data from the third party source systems. The EIS tier 210 may include database servers, enterprise resource planning systems, and other data sources, like mainframes.

In an exemplary operation, the system performs at least seven (7) steps associated with fetching, storing, and displaying information from the data files.

At step one (1), API data is leveraged to fetch data files (e.g., news articles and risk scores) from third parties.

At step two (2), the python-based module 216 stores at least part of the normalized data in the backend database 218 for search purposes.

At step three (3), the python-based module 216 stores ADS data into the MongoDB cluster 220.

At step four (4), a user interface deployed on One Ops and the NodeJS REST based API 214 request data from the MongoDB cluster 220.

At step five (5), cleaned/derived results are pushed to a user. The user can also input a request.

At step six (6), the NodeJS REST based API 214 stores user inputs, such as comments and events, in the MongoDB cluster 220.

At step seven (7), based on user input request, search results are fetched from the backend database 218 and displayed in the user dashboard.

Figure 3:
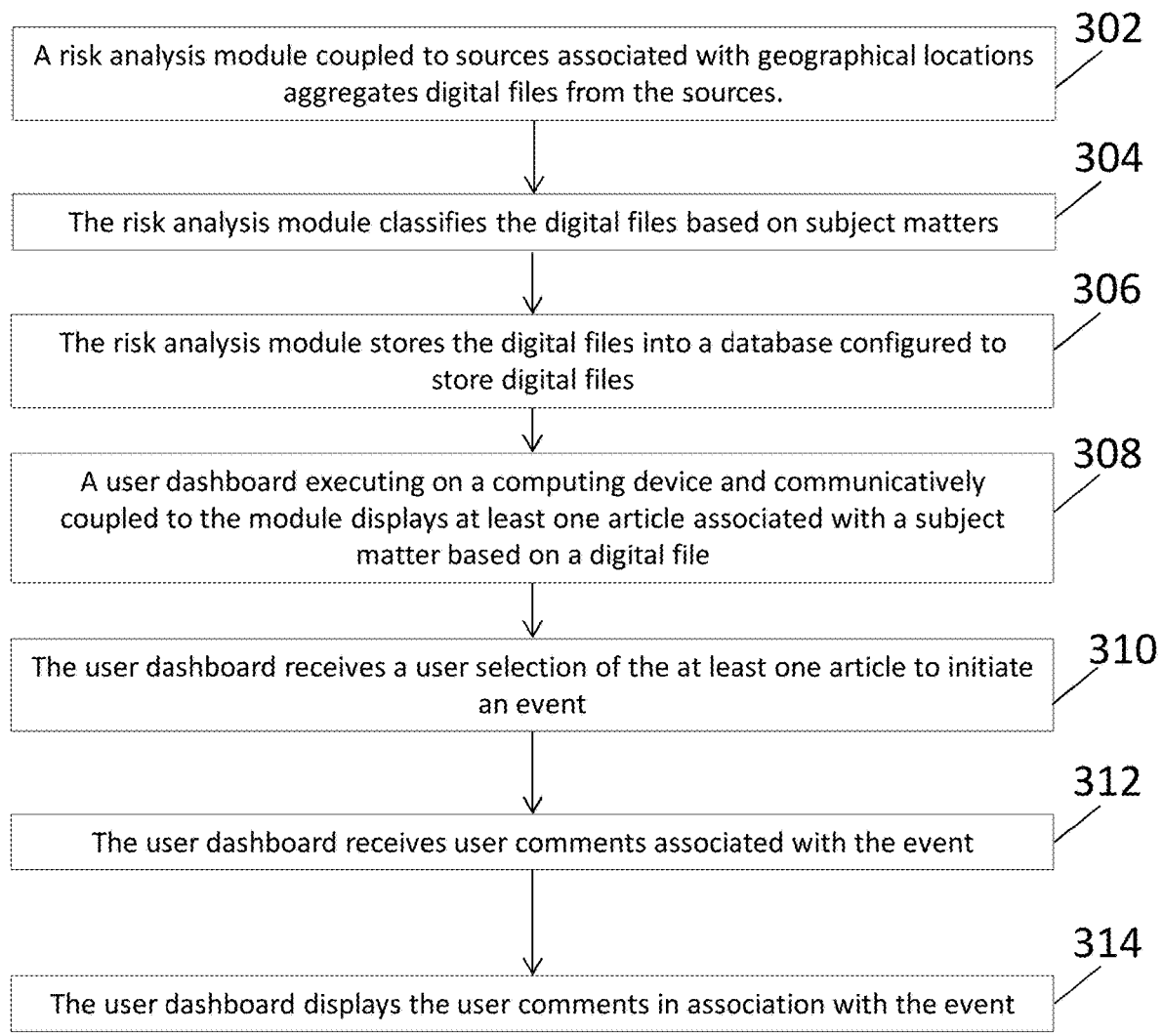
FIG. 3 illustrates a method for performing distributed risk analysis, in accordance with an exemplary embodiment.

FIG. 3 illustrates a method for performing distributed risk analysis, in accordance with an exemplary embodiment. In step 302, a risk analysis module that is coupled to third party sources, where each third party source is associated with a geographical location, aggregates data files received from the sources. In step 304, the risk analysis module classifies the data files based on subject matter. In step 306, the risk analysis module stores the data files into a database. In step 308, a user dashboard displays at least one article associated with a subject matter based on a data file. The user dashboard is executing on a computing device and is communicatively coupled to a risk analysis module. In step 310, the user dashboard receives a user selection of the at least one article to initiate an event. In step 312, the user dashboard receives user comments associated with the event. In step 314, the user dashboard displays the user comments in association with the event.

Figure 4:
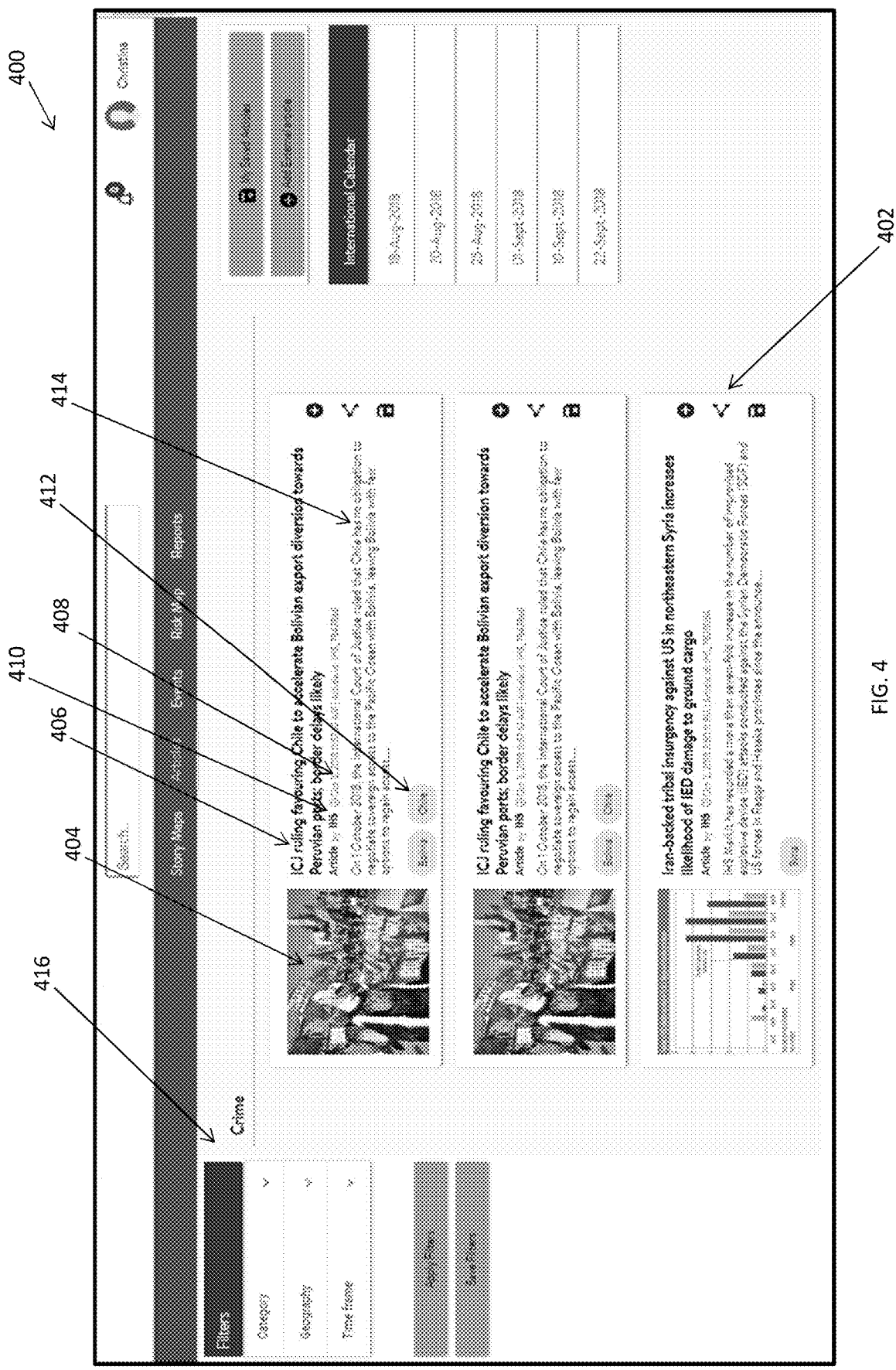
FIG. 4 illustrates an article feed interface for a user dashboard, in accordance with an exemplary embodiment.

FIG. 4 illustrates an article feed interface 400 for the user dashboard, in accordance with embodiments of the present disclosure. Using the article feed interface 400, a user can view a feed 402 of aggregated articles. The feed 402 provides users with frequently updated articles. The articles are stored in a database (i.e., database 118). Each article may include one or more of an image 404, a title 406, a date of the article 408, an originator of the article 410, location(s) associated with the article 412, and/or a summary of the article 414. It will be appreciated that other arrangements of articles are also within the scope of the present invention.

The user is able to select options 416 via the article feed interface 400 to filter the articles based on predefined criteria, such as category, geography, and/or time frame. In some embodiments, the user can select multiple filters (for example, the user can check one or more boxes to select filters). The user may then view the feed 402 based on the selected filters. By default, there may be N articles per page, for example, sorted by date. The user may also be able to sort articles by, for example, by newest articles first.

Figure 5:
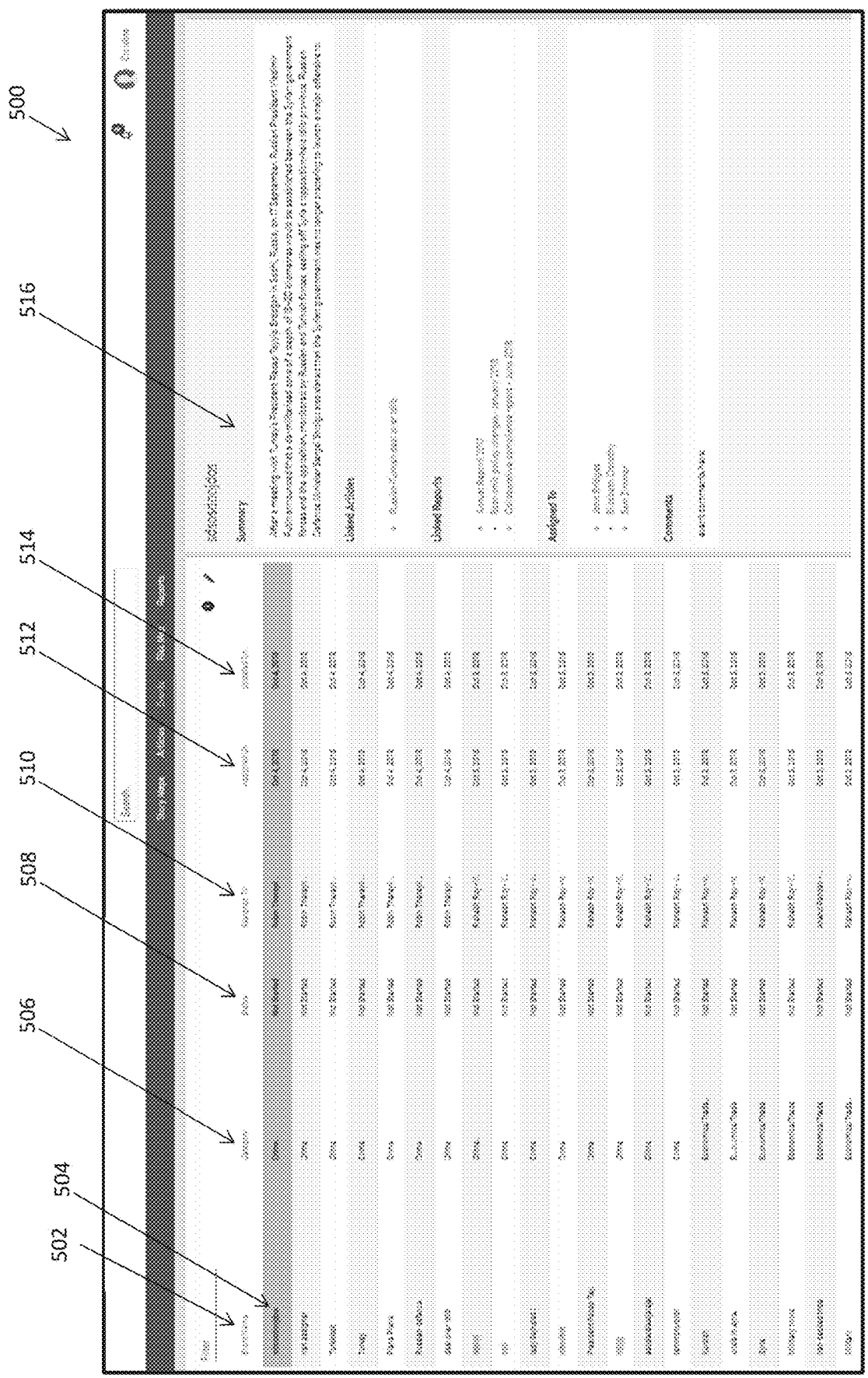
FIG. 5 illustrates an events list interface for the user dashboard, in accordance with an exemplary embodiment.

FIG. 5 illustrates an events list interface 500 for the user dashboard, in accordance with embodiments of the present disclosure. The interface 500 displays a list 502 of created events. Each event includes an event name 504, a category 506, a status of the event 508 (e.g., started, not started, completed), an assignment of the event to a user 510, a date that the event was assigned to the user 512, and/or a date that the event was last updated 514. The user can select an event and view information 516 associated with the event. The information 516 may include a summary of the article associated with the event, links to related articles, links to related reports, user(s) assigned to the event, and user comments associated with the event.

Figure 6:
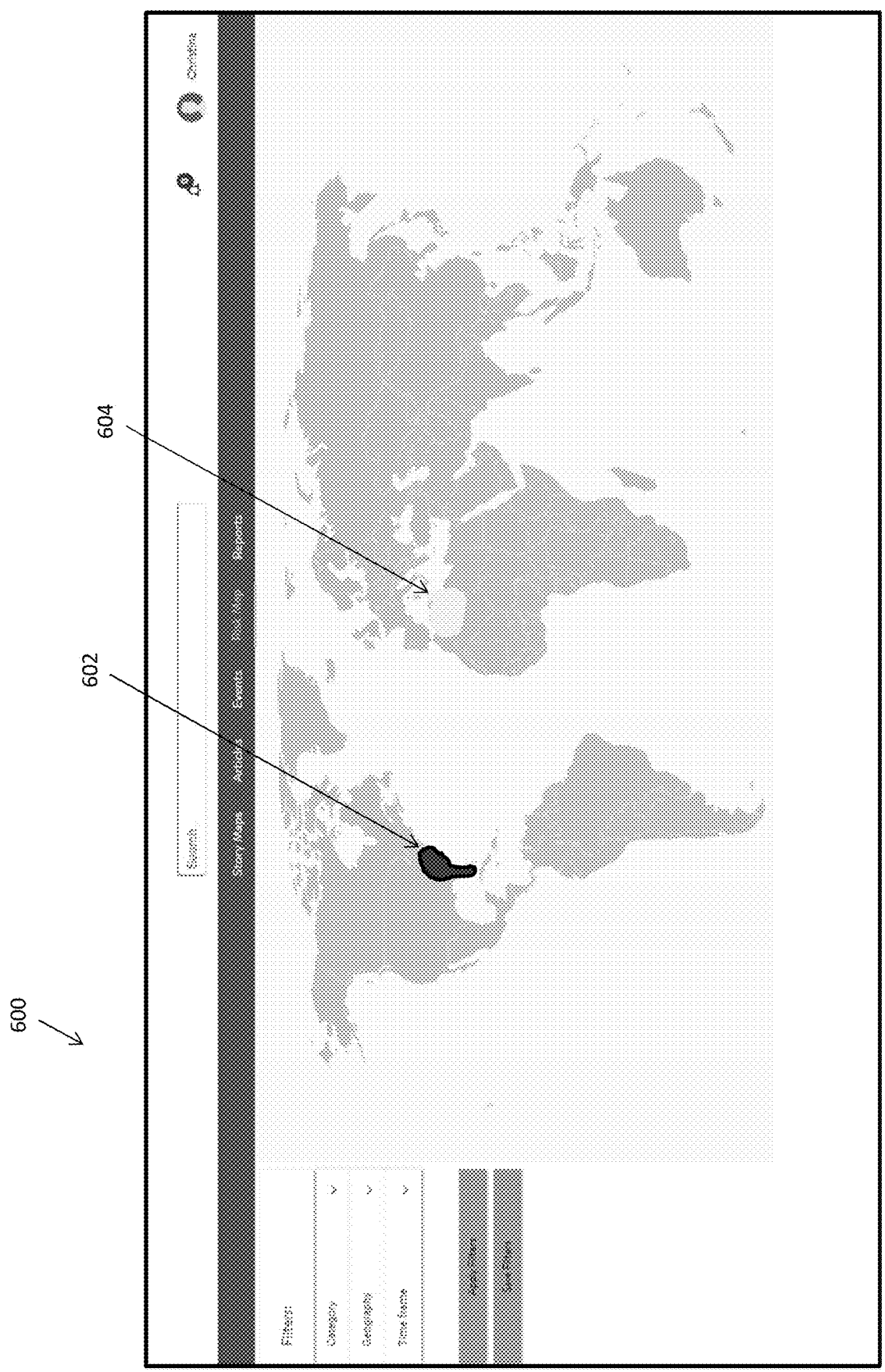
FIG. 6 illustrates a risk-related heat map for the user dashboard, in accordance with an exemplary embodiment.

FIG. 6 illustrates a risk-related heat map 600 for the user dashboard, in accordance with embodiments of the present disclosure. The risk-related heat map 600 represents risk in a form of a map in which risk values are represented as colors. For example, the map 600 can display a first color for a high risk area 602 and a second color for a low risk area 504. The risk may be from civil unrest, protests, corruption, war, risk of mortality, diseases, etc. For example, high risk areas are displayed in a red color while low risk areas are displayed in a blue color. As described herein, the risk analysis module receives risk scores from third party sources. Each risk score is associated with a state, region, country, etc. The risk score is a calculated number (the score) that reflects the level of risk in the presence of some risk factors (e.g., civil unrest, protests, corruption, war, risk of mortality or disease).

Figure 7:
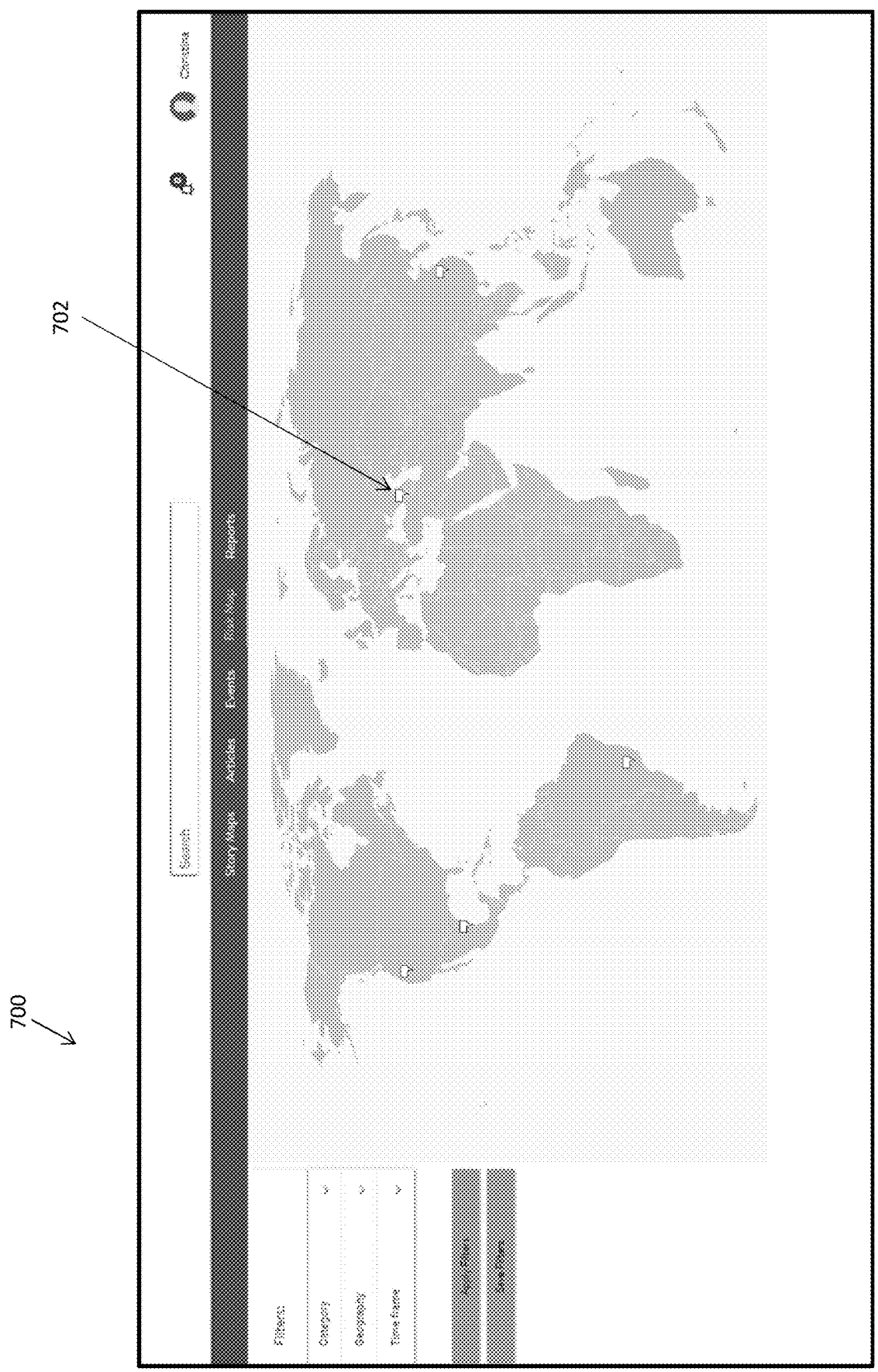
FIG. 7 illustrates a article-related map for the user dashboard, in accordance with an exemplary embodiment.

FIG. 7 illustrates an article-related map 700 for the user dashboard, in accordance with embodiments of the present disclosure. The risk analysis module collects and assembles data on articles, which is used to display locations associated with the articles and/or events on the article-related map 700 that highlights the locations of articles. For example, article-related map may indicate the presence of a large number of articles related to the Middle East. The risk analysis module may load data from a data file or create a javascript object to load into a map template.

In some embodiments, the user dashboard displays an article-related map that displays markers or pins at locations associated with articles and/or created events. For example, if a user creates an event associated with Austin, Tex., a marker for the event appears on Austin, Tex. on the article-related map. A user can then select the marker to be directed to a page on the user dashboard displaying the event. For example, United States, Canada, Central America, and Mexico may have location specific articles that are available to select and download (for example, Mexico BTR, CAM, item information template, etc.).

Figure 8:
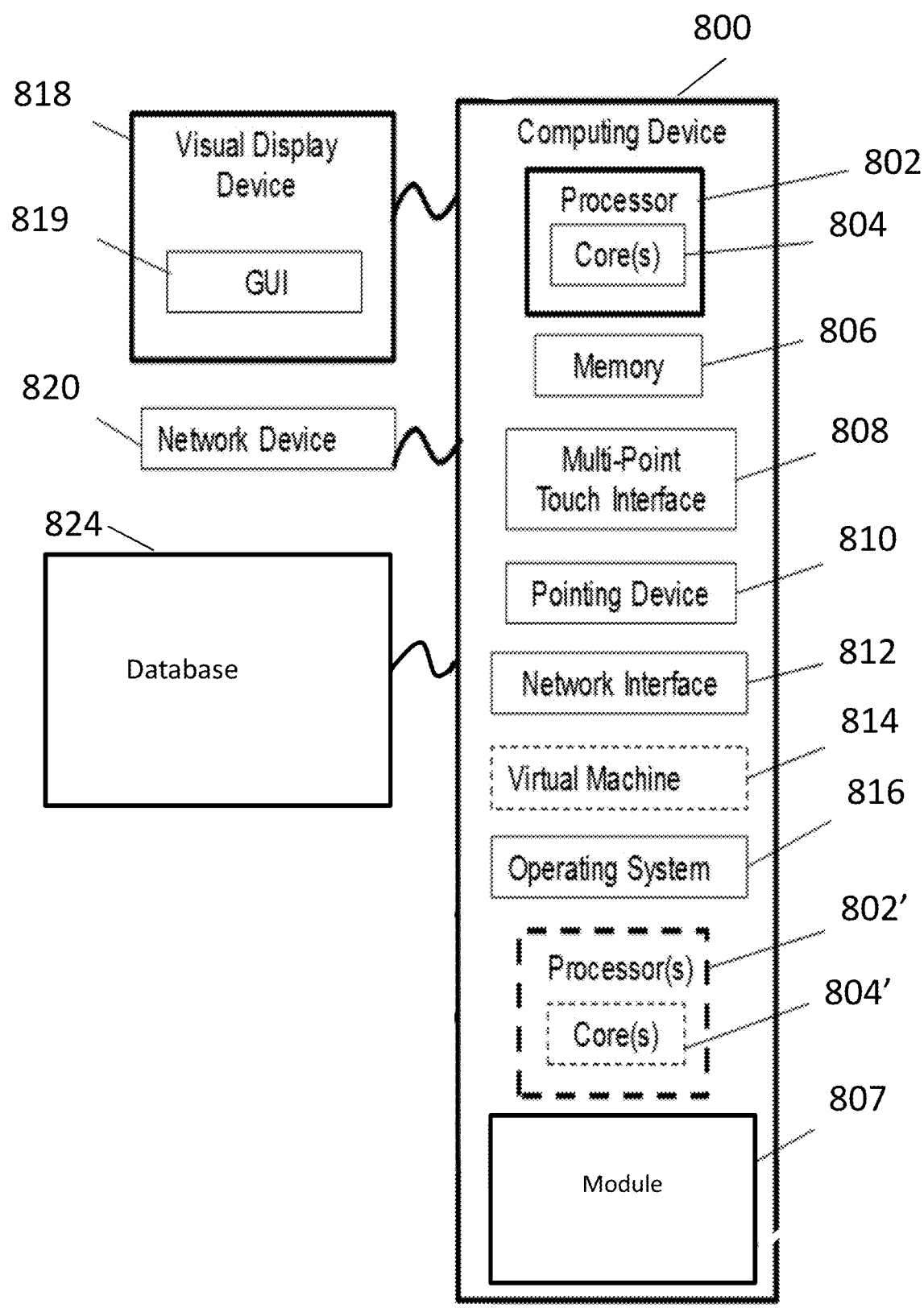
FIG. 8 is a block diagram of an exemplary computing device that can be used to perform one or more steps of the methods provided by exemplary embodiments.

FIG. 8 is a block diagram of an exemplary computing device 800 that can be used to perform one or more steps of the methods provided by exemplary embodiments. In an exemplary embodiment, computing device 800 includes DRA computing system 102. Computing device 800 includes one or more non-transitory computer-readable media for storing one or more computer-executable instructions or software for implementing exemplary embodiments. The non-transitory computer-readable media can include, but are not limited to, one or more varieties of hardware memory, non-transitory tangible media (for example, one or more magnetic storage disks, one or more optical disks, one or more USB flashdrives), and the like. For example, a memory 806 included in computing device 800 can store computer-readable and computer-executable instructions or software for implementing exemplary embodiments. Computing device 800 also includes a processor 802 and an associated core 804, and optionally, one or more additional processor(s) 802' and associated core(s) 804' (for example, in the case of computer systems having multiple processors/cores), for executing computer-readable and computer-executable instructions or software stored in memory 806 and other programs for controlling system hardware. Processor 802 and processor(s) 802' can each be a single core processor or multiple core (804 and 804') processor. Computing device 800 may include at least one module 807, such as a risk analysis module 115. Computing device 800 also includes and/or is communicatively coupled to one or more computing devices, as described in FIG. 1.

Virtualization can be employed in computing device 800 so that infrastructure and resources in the computing device can be shared dynamically. A virtual machine 814 can be provided to handle a process running on multiple processors so that the process appears to be using only one computing resource rather than multiple computing resources. Multiple virtual machines can also be used with one processor.

Memory 806 can include a computer system memory or random access memory, such as DRAM, SRAM, EDO RAM, and the like. Memory 806 can include other varieties of memory as well, or combinations thereof. In some embodiments, a user can interact with computing device 800 through a visual display device 818, such as a touch screen display or computer monitor, which can display one or more user interfaces 819 that can be provided in accordance with exemplary embodiments, for example, the exemplary user dashboard. Visual display device 818 may also display other aspects, elements and/or information or data associated with exemplary embodiments. Computing device 800 may include other I/O devices for receiving input from a user, for example, a keyboard or any suitable multi-point touch interface 808, a pointing device 810 (e.g., a pen, stylus, mouse, or trackpad). The keyboard 808 and pointing device 810 may be coupled to visual display device 818. Computing device 800 may include other suitable conventional I/O peripherals.

Computing device 800 can also include one or more databases devices 824, such as a hard-drive, CD-ROM, or other computer readable media, for storing data and computer-readable instructions and/or software that implements embodiments of the system, as described herein, or portions thereof. Exemplary storage device 824 can also store one or more storage devices for storing any suitable information required to implement exemplary embodiments. Database 824 may include one or more databases as described herein, such as a backend database 218 and a MongoBD cluster 220.

Computing device 800 can include a network interface 812 configured to interface via one or more network devices 820 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 812 can include a built-in network adapter, network interface card, PCMCIA network card, card bus network adapter, wireless network adapter, USB network adapter, modem or any other device suitable for interfacing computing device 800 to any variety of networks capable of communication and performing the operations described herein. Moreover, computing device 800 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

Computing device 800 can run any operating system 816, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 816 can be run in native mode or emulated mode. In an exemplary embodiment, the operating system 816 can be run on one or more cloud machine instances.

The following description is presented to enable any person skilled in the art to create and use a computer system configuration and related method and systems for distributed risk analysis. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component, or step. Likewise, a single element, component, or step can be replaced with a plurality of elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions, and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A system for performing distributed risk analysis, the system comprising:
   a database configured to store data files;
   a risk analysis module executable by at least one processor, the risk analysis module communicatively coupled to a plurality of third party sources associated with a plurality of geographical locations, the risk analysis module when executed:
      aggregates a plurality of data files from the plurality of third party sources, the data files associated with news articles and risk values,
      classifies the plurality of data files based on subject matter, and
      stores the plurality of data files into the database;
   a user dashboard executing on a computing device and communicatively coupled to the risk analysis module, the user dashboard configured to:
   display, based on subject matter and risk value, at least one article associated with a data file,
      receive a first selection of the at least one article to initiate an event;
   wherein a second selection is received to display a selection of the news articles and the second selection is effective to create a software filter, the software filter when executed filtering the news articles based upon one or more of a category, a geography, a time range, a predetermined numbered articles, and a user location, wherein the user location is determined by a GPS system;
   wherein the user dashboard displays a dynamic risk map that indicates risk trends, the risk map including multiple geographic entities, each of the entities having an associated risk score, the risk score being determined by multiple external entities, wherein each risk score after being received is normalized to a common scale, wherein viewable characteristics of each of the multiple geographic entities rendered on the risk map depend upon the associated risk score for the geographic entity.

2. The system of claim 1 wherein the user dashboard is further configured to receive user comments associated with the event, and display the user comments in association with the event.

3. The system of claim 1, wherein the risk analysis module, when executed, is further configured to:
   group articles based on related subject matter,
   wherein the user dashboard displays the grouped articles in a feed.

4. The system of claim 1, wherein the user dashboard displays an articles map that indicates a location of the at least one article or the event.

5. The system of claim 1, wherein the external entities comprise global risk subscription services.

6. The system of claim 1, wherein machine learning is used to suggest or display articles for a user.

7. The system of claim 1, wherein a user can use the user dashboard to at least one of create, save, edit, or share the at least one article.

8. A method for performing distributed risk analysis, the method comprising:
   aggregating, via a risk analysis module executable by at least one processor, the risk analysis module communicatively coupled to a plurality of third party sources associated with a plurality of geographical locations, a plurality of data files from the plurality of third party sources, the plurality of data files associated with news articles and risk values;
   classifying, via the risk analysis module, the plurality of data files based on subject matter;
   storing, via the risk analysis module, the plurality of data files into a database configured to store data files;
   displaying, via a user dashboard executing on a computing device and communicatively coupled to the module, based on subject matter and risk value, at least one article associated with a data file;
   receiving, via the user dashboard, a first selection of the at least one article to initiate an event;
   determining a user location using a GPS system;
   receiving, via the user dashboard, a second selection to display a selection of the news articles, the second selection being effective to create a software filter, the software filter when executed filtering the news articles based upon one or more of a category, a geography, a time range, a predetermined numbered articles, and the user location;
   displaying, via the user dashboard, a dynamic risk map that indicates risk trends, the risk map including multiple geographic entities, each of the entities having an associated risk score, the risk score being determined by multiple external entities, wherein each risk score after being received is normalized to a common scale, wherein viewable characteristics of each of the multiple geographic entities rendered on the risk map depend upon the associated risk score for the geographic entity.

9. The method of claim 8, further comprising:
   receiving, via the user dashboard, user comments associated with the event; and
   displaying, via the user dashboard, the user comments in association with the event.

10. The method of claim 8, further comprising:
    grouping, via the risk analysis module, articles based on related subject matter,
    wherein the user dashboard displays the grouped articles in a feed.

11. The method of claim 8, further comprising displaying, via the user dashboard, an articles map that indicates a location of the at least one article or the event.

12. The method of claim 8, wherein the external entities comprise global risk subscription services.

13. The method of claim 8, further comprising using, via the risk analysis module, machine learning to suggest or display articles for the user.

14. The method of claim 8, wherein a user can use the user dashboard to at least one of create, save, edit, or share the at least one article.

15. A non-transitory computer-readable medium having instructions stored thereon that, when executed by a processor, cause a system to:
- aggregate, via a risk analysis module executable by at least one processor, the risk analysis module communicatively coupled to a plurality of third party sources associated with a plurality of geographical locations, a plurality of data files from the plurality of third party sources, the plurality of data files associated with news articles and risk values;
- classify, via the risk analysis module, the plurality of data files based on subject matter;
- store, via the risk analysis module, the plurality of data files into a database configured to store data files;
- display, via a user dashboard executing on a computing device and communicatively coupled to the module, based on subject matter and risk value, at least one article associated with a data file;
- receive, via the user dashboard, a first selection of the at least one article to initiate an event;
- receive, via the user dashboard, a second selection to display a selection of the news articles, the second selection being effective to create a software filter, the software filter when executed filtering the news articles based upon one or more of a category, a geography, a time range, a predetermined numbered articles, and a user location, wherein the user location is determined by a GPS system;
- display, via the user dashboard, a dynamic risk map that indicates risk trends, the risk map including multiple geographic entities, each of the entities having an associated risk score, the risk score being determined by multiple external entities, wherein each risk score after being received is normalized to a common scale, wherein viewable characteristics of each of the multiple geographic entities rendered on the risk map depend upon the associated risk score for the geographic entity.

16. The non-transitory computer-readable medium of claim 15, wherein the instructions further cause the system to:
- receive, via the user dashboard, user comments associated with the event; and
- display, via the user dashboard, the user comments in association with the event.

17. The non-transitory computer-readable medium of claim 15, wherein the instructions further cause the system to:
- group, via the risk analysis module, articles based on related subject matter, wherein the user dashboard displays the grouped articles in a feed.

18. The non-transitory computer-readable medium of claim 15, wherein the instructions further cause the machine learning system to display, via the user dashboard, an articles map that indicates a location of the at least one article or the event.

19. The non-transitory computer-readable medium of claim 15, wherein the user can use the user dashboard to at least one of create, save, edit, or share the at least one article.

* * * * *